United States Patent [19]

Warren

[11] 4,196,453
[45] Apr. 1, 1980

[54] IMAGE SCREENING SYSTEM
[75] Inventor: W. Thomas Warren, Webster, N.Y.
[73] Assignee: Xerox Corporation, Stamford, Conn.
[21] Appl. No.: 965,668
[22] Filed: Dec. 1, 1978
[51] Int. Cl.² ............................................. H04N 1/40
[52] U.S. Cl. .................................. 358/283; 358/284; 364/515; 358/298
[58] Field of Search ............... 358/283, 296, 298, 302, 358/282, 284; 364/515

[56] References Cited
U.S. PATENT DOCUMENTS

| | | | |
|---|---|---|---|
| 4,004,079 | 1/1977 | Boston | 358/256 |
| 4,051,536 | 9/1977 | Roetling | 358/283 |
| 4,084,259 | 4/1978 | Cahill et al. | 358/298 |
| 4,109,211 | 8/1978 | Mese et al. | 328/116 |

*Primary Examiner*—Robert L. Griffin
*Assistant Examiner*—Edward L. Coles

[57] ABSTRACT

A system for screening image data provided in digital format. The image data is first electronically examined to determine whether or not the data is comprised of highlight, shadow, or midtone. Where the image data is determined to be midtone, the data is processed using a high frequency electronic screen. Where the image data is determined to be highlight or shadow, the data is processed using a low frequency electronic screen.

11 Claims, 12 Drawing Figures

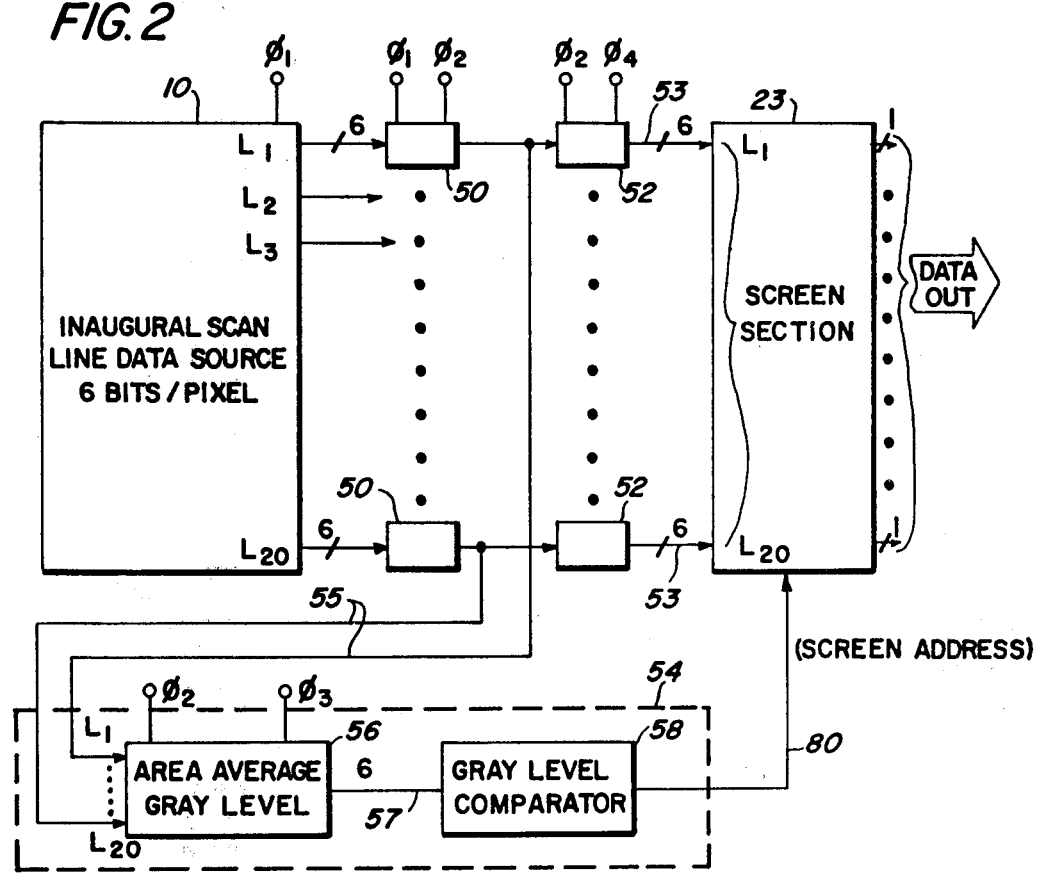
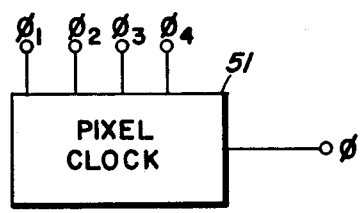

FIG. 8

| 1 | 1 | 1 | 1 | 3 | 3 | 3 |
|---|---|---|---|---|---|---|
| 1 | 1 | 2 | 2 | 2 | 3 | 3 |
| 1 | 1 | 2 | 2 | 2 | 3 | 3 |
| 1 | 1 | 2 | 2 | 3 | 3 | 3 |
| 5 | 4 | 4 | 3 | 3 | 3 | 3 |
| 5 | 4 | 4 | 3 | 3 | 3 | 4 |

170

| 22 | 22 | 23 | 24 | 26 | 26 | 28 |
|----|----|----|----|----|----|----|
| 22 | 22 | 23 | 25 | 25 | 26 | 28 |
| 22 | 23 | 23 | 25 | 26 | 26 | 28 |
| 24 | 24 | 25 | 27 | 28 | 30 | 31 |
| 24 | 25 | 27 | 23 | 28 | 29 | 30 |
| 24 | 26 | 27 | 29 | 29 | 30 | 31 |

172

| 59 | 60 | 61 | 61 | 61 | 61 |
|----|----|----|----|----|----|
| 59 | 60 | 61 | 61 | 61 | 62 |
| 60 | 60 | 61 | 61 | 61 | 62 |
| 60 | 60 | 60 | 60 | 61 | 61 |
| 59 | 60 | 60 | 60 | 61 | 61 |
| 59 | 59 | 60 | 60 | 60 | 61 |

| 1 | 1 | 1 | 1 | 0 | 1 |
|---|---|---|---|---|---|
| 1 | 1 | 1 | 1 | 1 | 1 |
| 1 | 1 | 1 | 1 | 1 | 1 |
| 1 | 1 | 1 | 1 | 1 | 1 |
| 0 | 1 | 1 | 1 | 1 | 1 |
| 1 | 1 | 1 | 0 | 1 | 1 |

170'

| 1 | 1 | 0 | 0 | 1 | 1 |
|---|---|---|---|---|---|
| 1 | 1 | 1 | 0 | 1 | 1 |
| 1 | 1 | 1 | 1 | 0 | 1 |
| 0 | 0 | 1 | 1 | 0 | 0 |
| 1 | 1 | 0 | 0 | 1 | 1 |
| 1 | 1 | 1 | 0 | 1 | 1 |

172'

| 0 | 0 | 0 | 0 | 0 | 0 |
|---|---|---|---|---|---|
| 0 | 0 | 0 | 0 | 0 | 0 |
| 0 | 0 | 1 | 1 | 0 | 0 |
| 0 | 0 | 0 | 0 | 0 | 0 |
| 0 | 0 | 0 | 0 | 0 | 0 |
| 0 | 0 | 0 | 0 | 0 | 0 |

174'

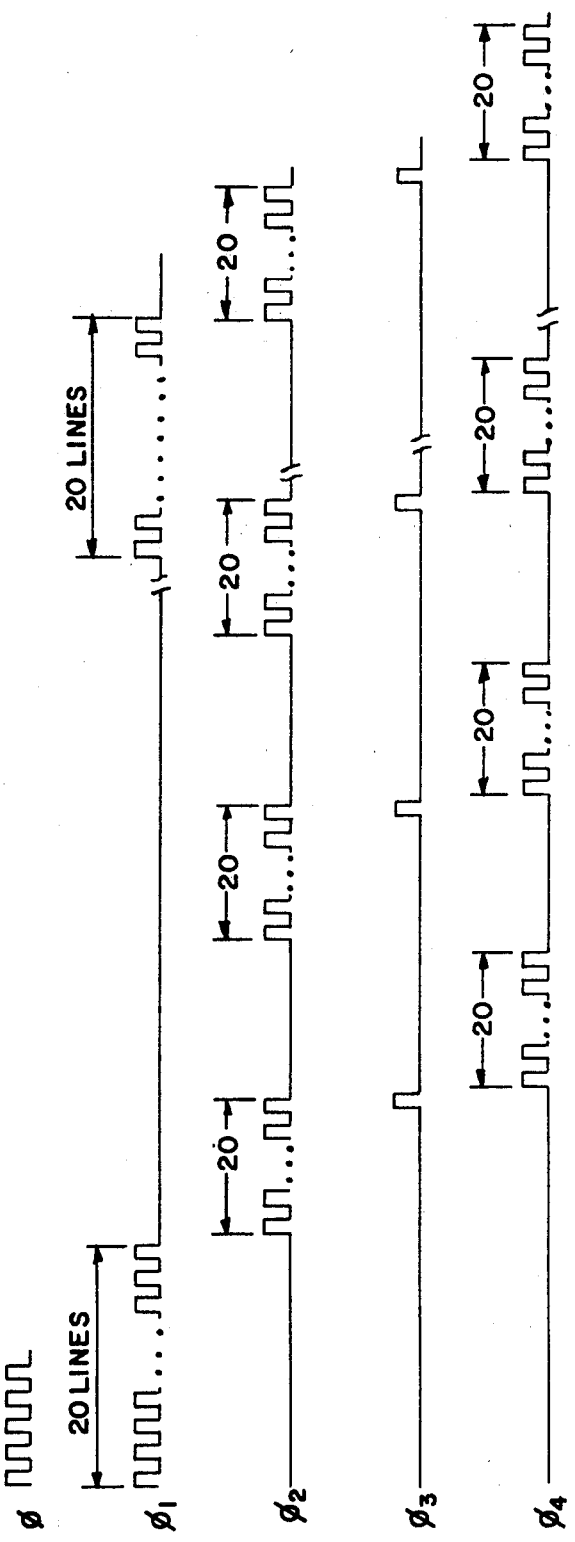

IMAGE SCREENING SYSTEM

This invention relates to electronic image processing, and more particularly to an improved image screening process and apparatus.

In electronic imaging systems, the image data representative of the original image may be provided by a raster scanner, different types of which may be readily envisioned. Scanners of this type serve to convert the original image into a series of electrical signals, the voltage levels of which reflect the image pattern viewed. Where the original image comprises a halftone or continuous tone image, i.e., a picture, halftone screening of the image signals generated by the scanner is normally necessary in order to convert the image signals to a more usable form. For example, signals of this type may be fed to a copy printer when copies of the original are desired.

Often, in such systems, a xerographic type printer is used to produce the final copies. However, xerographic systems are known to print very small dots (i.e. a 5 to 10% halftone dot area) and very large dots (i.e. a 90 to 100% halftone dot area) with difficulty. More particularly, small dots tend not to be developable in xerographic systems while large dots tend to be overdeveloped.

While screening of the image data enhances its reproducibility, inasmuch as an original image may be comprised of image scenes of varying optical densities, the particular screen chosen may not be able to effectively and efficiently screen all parts of the original image. Instead there may result noticeable derogation in some areas of the image copy at the expense of others.

This invention relates to a method of screening an original which may be comprised of shadow, midtone or highlight images, or some combination thereof, to enhance printing of copies of the original by a xerographic type copier while offsetting any limitations of the copier to print relatively small and relatively large dots, comprising the steps of: obtaining the average gray level of a preset area of the original to be processed; comparing the average gray level with predetermined gray level thresholds; where the average gray level is below a first threshold indicating the preset image area to be highlight, screening the preset image area with a low frequency screen; where the average gray level is above a second higher threshold indicating the preset image area to be a shadow, screening the preset image area with a low frequency screen; where the average gray level is between first and second thresholds indicating the preset image area to be midtone, screening the preset image area with a high frequency screen; and repeating the above steps until the entire original has been processed.

The objects and advantages of the present invention will be apparent from the ensuing description and drawings in which:

FIG. 2 is schematic view of the screening system including the screen selection control of the present invention;

FIG. 8 illustrates exemplary highlight, midtone, and shadow image portions before screening;

FIG. 9 illustrates the highlight, midtone, and shadow image portions of FIG. 8 following screening in accordance with the teachings of the present invention;

FIG. 11 is a timing chart showing the timing interrelationship between the various components of the screening system of the present invention.

Figure 5:
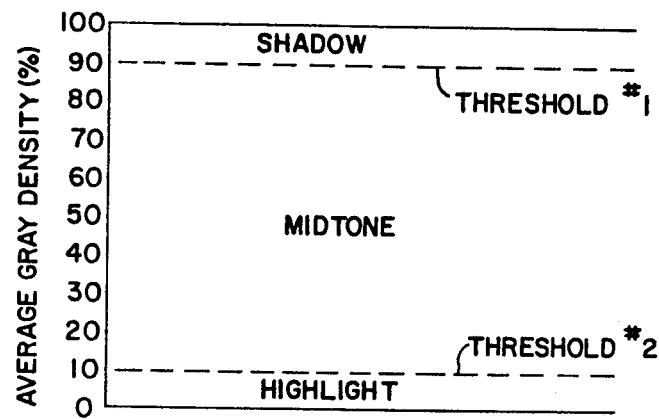
FIG. 5 is a chart illustrating exemplary highlight, midtone and shadow threshold levels.

As used herein, the term "pixel" refers to a "picture element" which comprises a voltage level representation of a minute and discrete portion of an original image. A highlight image is an image area whose average gray level or optical density is relatively low, i.e., the image is very light. Typically, highlight image areas are made up of 5-10% black dots. A shadow area is an image area whose average gray level or optical density is high, i.e. the image is very dark. Typically, shadow image areas comprise image areas made up of 90-100% black dots. Midtone image areas are those image areas whose average gray level or optical density lies between highlight and shadow image areas. A graphical example of the relationship between highlight, midtone, and shadow image areas is shown in FIG. 5.

In the ensuing description, the input image frequency from image source 10 (in the X direction for example) is presumed to be at the rate of 500 pixels per inch with a scanning frequency (in the Y direction) of 500 lines per inch. The image data is processed in block-like fashion, each block 45 of image data being 20 pixels long by 20 lines wide. See FIGS. 6 and 7.

While other input image data frequencies and image block sizes may be envisioned, the image area to be examined, i.e. block 45, is desirably small enough not to emphasize contouring between the different scanning frequencies which may be used depending on whether the image is determined to be highlight, shadow, or midtone. And, as will appear more fully herein, the frequencies of the various screens that are used to process the various types of image data are chosen such that the screen areas divide equally into the image area being processed, i.e. the 20×20 block 45.

In accordance with the invention, each block of image data is first examined to determine if the image area represented by the block is a shadow, midtone, or highlight image area. In a first embodiment, if the image area examined is midtone, the image area is screened using a high frequency screen. If the image area is determined to be highlight or shadow, a low frequency screen is used.

In a second embodiment, a high frequency screen is used for image areas that are determined to be both midtone and shadow. A low frequency screen is employed where the image area is found to be a highlight area.

Figure 1:
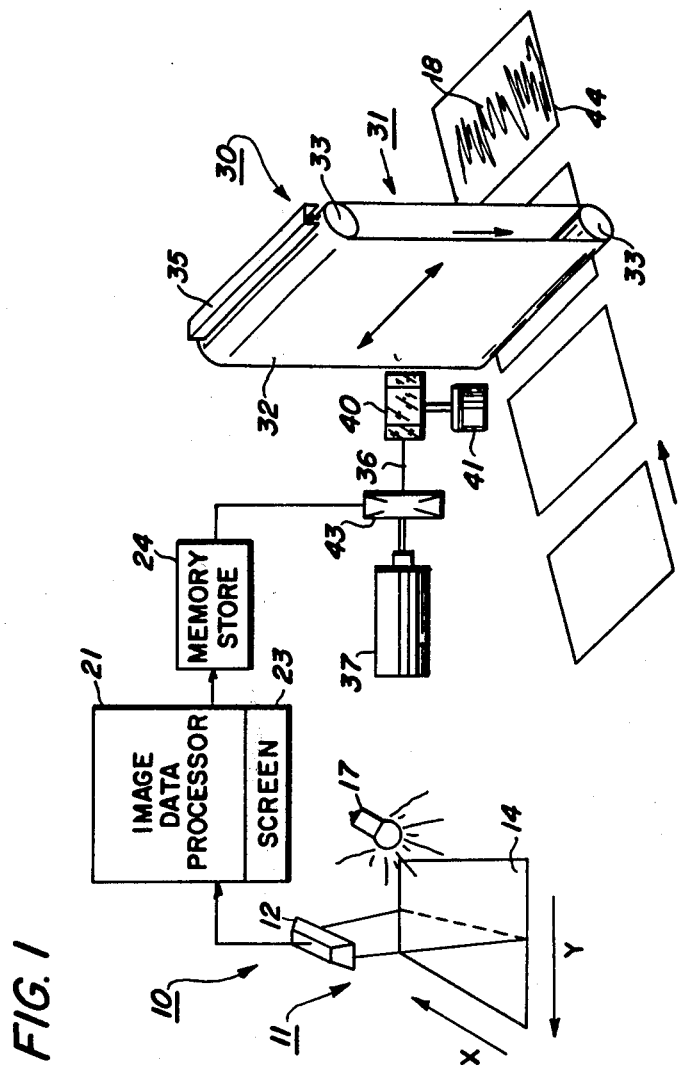
FIG. 1 is a schematic view of an exemplary electronic imaging processing apparatus embodying the present invention.

In FIG. 1, an exemplary electronic image processing system incorporating the data processing system of the present invention is thereshown in schematic form. The image processing system thereshown includes a source 10 of image data to be processed illustrated by scanning means 11. Scanning means 11 has one or more charge coupled devices (CCD) 12 adapted to raster scan, on a line by line basis, an original document 14 to provide the image data to be processed. In the example considered, the output frequency of the image data produced by scanning means 11 is 500 pixels per inch (in the X direction) by 500 lines per inch (in the Y direction).

A suitable illumination source, shown as lamp 17, is provided to illuminate the document during scanning. CCD 12 may be supported on a movable carriage (not shown) arranged to carry CCD 12 in the Y direction past document 14 during the scanning cycle. Suitable lens means (not shown) are provided to focus the image rays onto CCD 12, with control means (not shown) provided to control the various scanning means components.

CCD 12, which operates to convert the graphical image that comprises document 14 into an electronic image, consists of a multiplicity of photosensors on which charges are built proportional to the luminous energy reflected from the document 14 during each scan. The charges, (herein, pixels), which in the example discussed, may range from a "0" representing blackest black to "63" representing whitest white are thereafter transferred from the photosensors to a shift register pair for temporary storage. In one manner of operation, the charges on odd order photosensors are transferred to one shift register while the charges on the even order photosensors are transferred to the other shift register. Thereafter, the outputs of the shift registers are sampled sequentially, alternating between the registers such that the pixel output of the CCD appear in correct sequential order.

One suitable CCD comprises Fairchild Model No. 1728 by Fairchild Manufacturing Company.

Image data from CCD 12 is inputted to image data processor 21 of the present invention whereat the image data is processed pending storage and/or use thereof. Processor 21 includes a screening section 23 having multiple screens of different frequency stored therein for converting the image data to binary form prior to storage and/or use thereof as will appear.

Following processing of the image data, the data may be inputted to a suitable storage device or memory 24 where the data is stored pending use thereof by a suitable output device such as printer 30. Printer 30 includes a xerographic processing unit 31 with endless photoconductive belt 32 movably disposed about roller pair 33. A charging device 35 places a uniform electrostatic charge on belt 32 preparatory to exposure thereof by imaging beam 36. Imaging beam 36, which scans across belt 32, is derived from a suitable light source such as laser 37 via a reflective polygon 40. Polygon 40 is rotated by motor 41 to reflectively scan imaging beam 36 across belt 32. A suitable light beam control such as acousto optic modulator 43 regulates the intensity of imaging beam 36 in response to image data from memory 24 to selectively discharge belt 32 and form thereon a latent electrostatic image of the original document 14. Following development (not shown), the image is transferred to a copy sheet 44. A suitable fuser (not shown) fixes the transferred image to provide a permanent copy.

Sources of image data other than the aforedescribed scanning means 11, and/or data users other than printer 30 may be readily contemplated.

Referring to FIG. 2, image data from data source 10 is inputted to scan line buffers 50 of image data processor 21, there being one buffer 50 for each line of image data processed. Buffers 50, which comprise any suitable commercially available digital storage buffers, serve, in the exemplary embodiment described herein, to temporarily store the image data from twenty consecutive image lines (designated as lines $L_1$, $L_2$, $L_3$, ... $L_{20}$ herein) pending processing thereof. As described earlier herein, data from buffers 50, is processed in blocks 45, each block being twenty pixels long by twenty lines wide. Clock signals $\phi_1$ from pixel clock 51 serve to load buffers 50, with the next group of scan lines (i.e. lines $L_{21}$ ... $L_{40}$) following processing of the last pixel in the preceding group of lines (i.e. lines $L_1$ ... $L_{20}$).

Image data from buffers 50, is unloaded into pixel delay buffers 52 in blocks of 20 pixels each on clock signals $\phi_2$. One pixel delay buffer 52 is provided for each line of image data processed. Delay buffers 52 serve to delay screening of the image data for a twenty pixel count while a suitable screen is selected. From delay buffers 52, the image data is fed through lines 53 to electronic halftone screening section 23. There the image data is screened with the appropriate screen as selected by screen selection circuit 54. Following screening, the image data, now in binary form, is fed to memory store 24.

It will be understood that processing image pixels in blocks of twenty simultaneously from twenty consecutive lines (i.e. lines $L_1$, $L_2$, $L_3$, ... $L_{20}$) provides the 20×20 block 45 referred to earlier herein.

To permit the appropriate screen to be selected, the image data from line buffers 50, is fed via lines 55 to Area Average Gray Level calculator 56 of screen selection circuit 54 wherein the average gray level of the block 45 of image data is determined. The output of calculator 56 is fed via line 57 to Gray Level Comparator 58 whereat the average gray level of the block being processed is compared to predetermined standards to permit the appropriate screen to be selected.

Figure 3:
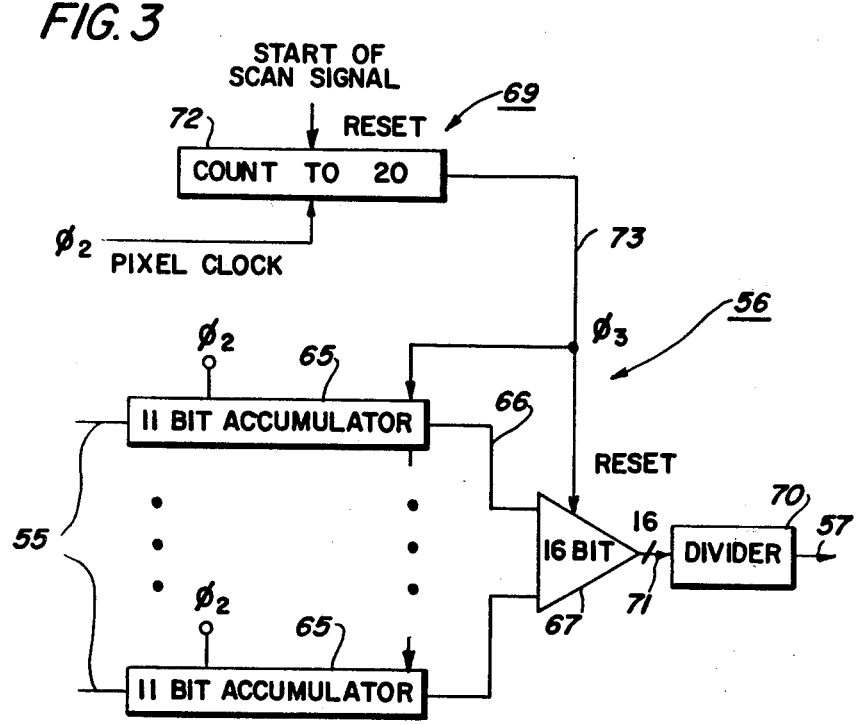
FIG. 3 is a detailed view of the area average gray level calculator of FIG. 2.

Referring now to FIG. 3 of the drawings, Area Average Gray Level Calculator 56 includes a series of 11 bit accumulators 65, there being one accumulator 65 associated with each of the lines $L_1$, $L_2$, $L_3$, ... $L_{20}$ being processed. Accumulators 65 may, for example, comprise three concatenated Texas Instrument adder chips No. 7483 with storage flip flops. The image data is fed to accumulators 65 in blocks of 20 pixels each on clock signals $\phi_2$ as the data is being inputted to delay buffers 52. Accumulators 65 on clock signals $\phi_3$, add together the twenty pixel block of image data in the image lines $L_1$, $L_2$, $L_3$, ... $L_{20}$ associated therewith to provide a single 11 bit output in leads 66, representative of the sum of the twenty pixels in each line $L_1$, $L_2$, $L_3$ ... $L_{20}$, to adder 67. Adder 67, which comprises any suitable 16 bit adder, such as Texas Instrument chip No. S. N. 7483, on enabling pulse $\phi_3$ from timing circuit 69, sums the inputs thereto to provide a 16 bit output representative of the total sum of the image pixels that comprise the block 20 of image data being processed. Effectively then, accumulators 65 and adder 67 have summed the discrete image values of the twenty pixels of each line $L_1$, $L_2$, $L_3$ ... $L_{20}$ that comprise the 20×20 block 45 being processed to provide a single total image value.

The output of adder 67 is fed to divider 70 via line 71. Divider 70 may comprise dividend, quotient, and divisor storage shift registers with adder control chips arranged to carry out arithmetic division in a manner known to those skilled in the art. Divider 70 divides the output of adder 67 by 400, the total number of pixels that comprise the 20×20 block 45. The output of divider 70 provides a 6 bit representation of the average input gray level for the block 45 of image data being processed.

Timing circuit 69 serves to provide an enabling pulse $\phi_3$ for unloading accumulators 65 following processing of each twenty pixel block of image data and triggering adder 67 to sum the discrete inputs from accumulators 65. Circuit 69 comprises a suitable counter 72 set to produce an enabling signal $\phi_3$ in line 73 to accumulators 65 and adder 67 on each count of 20 following which counter 72 resets to zero and begins a new count. Count 72 is driven by clock pulses $\phi_2$ from pixel clock 51.

Figure 4:
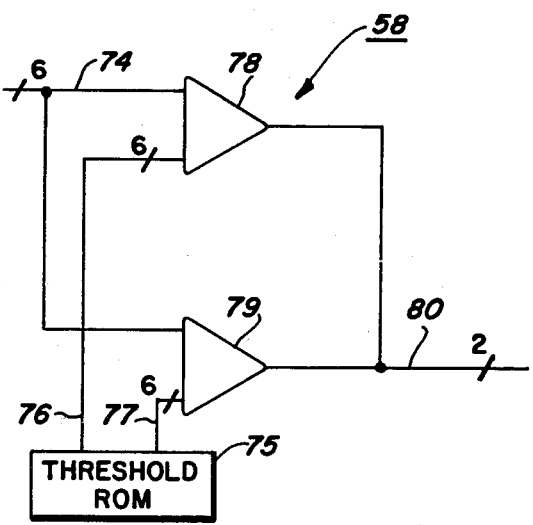
FIG. 4 is a detailed view of the gray level comparator of FIG. 2.

Referring now to FIGS. 4 and 5 of the drawings, Gray Level Comparator 58 serves to compare the average gray level value of the block 45 of image data being examined, which forms the output of Area Average Gray Level Calculator 56, with plural thresholds (identified herein as threshold 1 and threshold 2) to determine if the block of image data is shadow, midtone, or highlight. Thresholds 1 and 2 are chosen to differentiate between shadow and midtone, and midtone and highlight respectively. For example, thresholds 1 and 2 may represent average gray densities of 10% and 90%, which in the 0-63 pixel image value range alluded to earlier, comprise threshold levels of approximately 57 and 6 respectively.

Referring particularly to FIG. 4, comparator 58 includes a suitable threshold read only memory (ROM) 75 for providing predetermined digital signals representative of thresholds 1 and 2 in output lines 76, 77 thereof. A pair of digital comparators 78, 79 are provided. One input gate of comparators 78, 79 is coupled to lines 76, 77 respectively. Line 74, bearing the average input gray level of the image data block 45 being processed, is coupled to the other input gate of both comparators 78, 79.

Comparators 78, 79 function to compare the average gray level signal from calculator 56 with thresholds 1 and 2 respectively to classify the image data block 45 being processed as highlight, midtone, or shadow. The signal output of comparators 78. 79 in line 80 forms an address for addressing the appropriate screen in ROM memories 112 of screening section 23.

Figure 6:
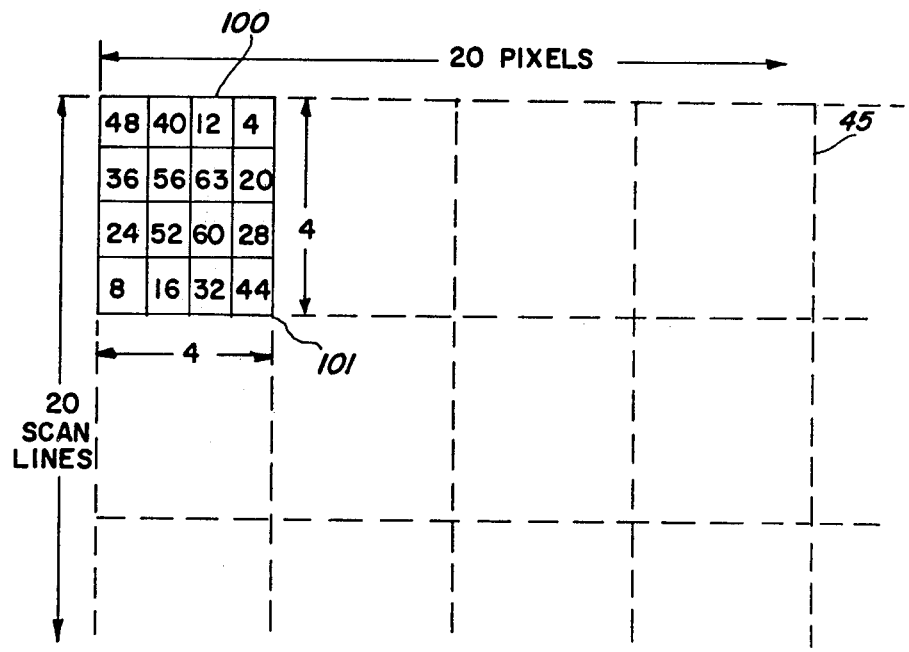
FIG. 6 is an example of a high frequency screen with threshold values.
Figure 7:
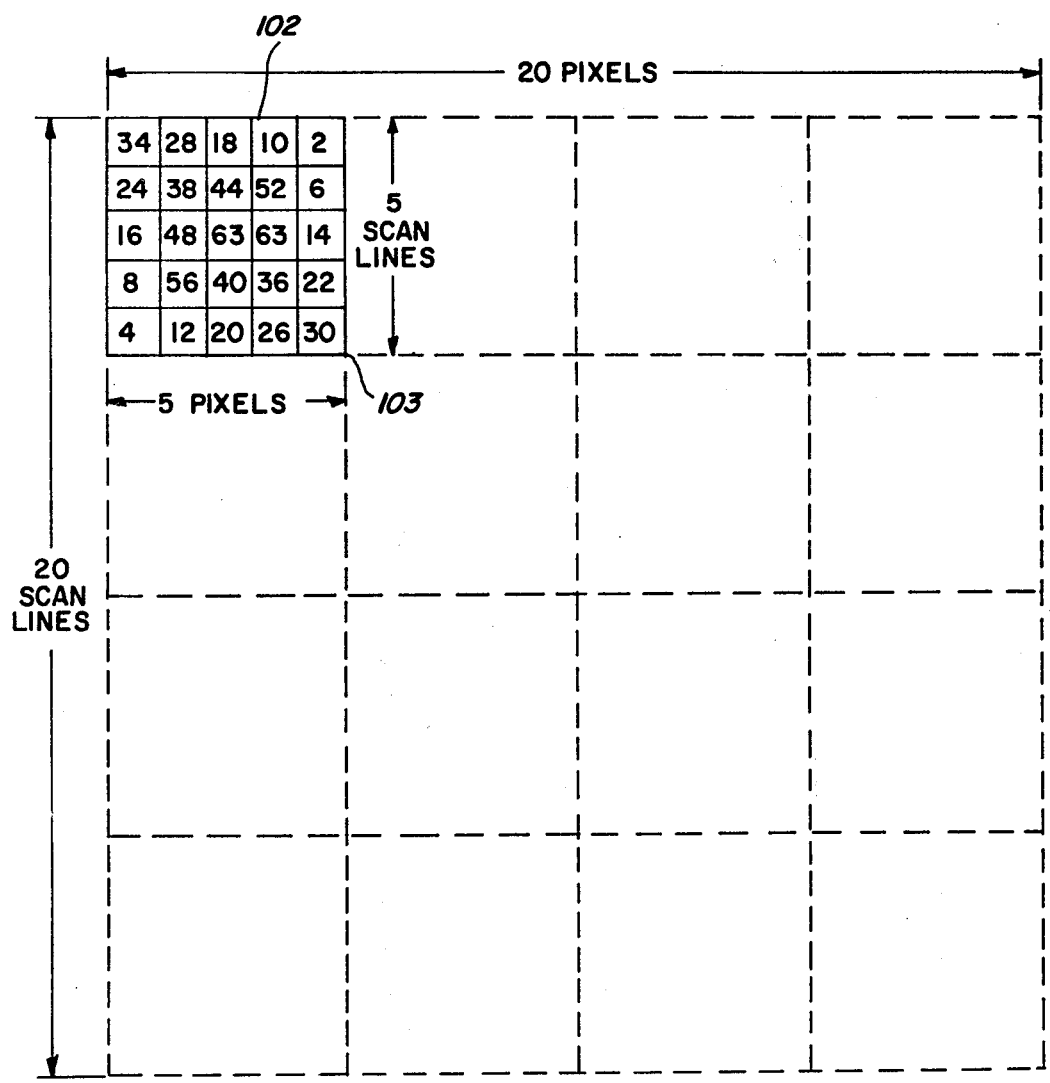
FIG. 7 is an example of a low frequency screen with threshold values.

Referring particularly to FIGS. 6 and 7 of the drawings, examples of high and low frequency halftone screens 100, 102 respectively are thereshown with typical voltage thresholds represented thereon. In the example being discussed, the image data from data source 10 is presumed to be at the rate of 500 pixels/inch at 500 scan lines/inch. Screen 100 represents a high frequency screen of 125 dots/inch which breaks down, at the data rates suggested, in a 4×4 pixel matrix 101 as shown in FIG. 6. Screen 102 which is representative of a lower frequency screen of 100 dots/inch, breaks down into a 5×5 pixel matrix 103 seen in FIG. 7. As can be seen from a study of FIGS. 6 and 7, a plurality of screen pixel matrices are required to completely screen the 20×20 image data block 45. In the case of screen 100, screen matrix 101 thereof is repeated 25 times per image data block 45; in the case of screen 102, screen matrix 103 thereof is repeated 16 times per image data block 45.

While other screen frequencies may be contemplated, the screen frequency chosen should be evenly divisible into the rate at which image data is supplied to assure an even number of pixel matrices for the size data block being processed as in the exemplary screens 100, 102. To further elucidate, a very low frequency screen of 50 dots/inch may be used. This produces a 10×10 pixel matrix, four of which are required to complete screening of one image data block 45.

In screening the image data, where the voltage level of a pixel is equal to or above the screen threshold value, a binary "0" output results. Where the voltage level of the pixel is below the screen threshold value, a binary "1" output results.

In FIG. 8, examples of shadow, midtone, and highlight image data 170, 172, 174 are shown. Screening of midtone image data 172 with high frequency screen 100 results in the binary level image output pattern 172' shown in FIG. 9. Screening of shadow and highlight image data 170, 174 respectively with low frequency screen 102 results in the binary level image output patterns 170', 174' respectively as shown in FIG. 9.

Figure 10:
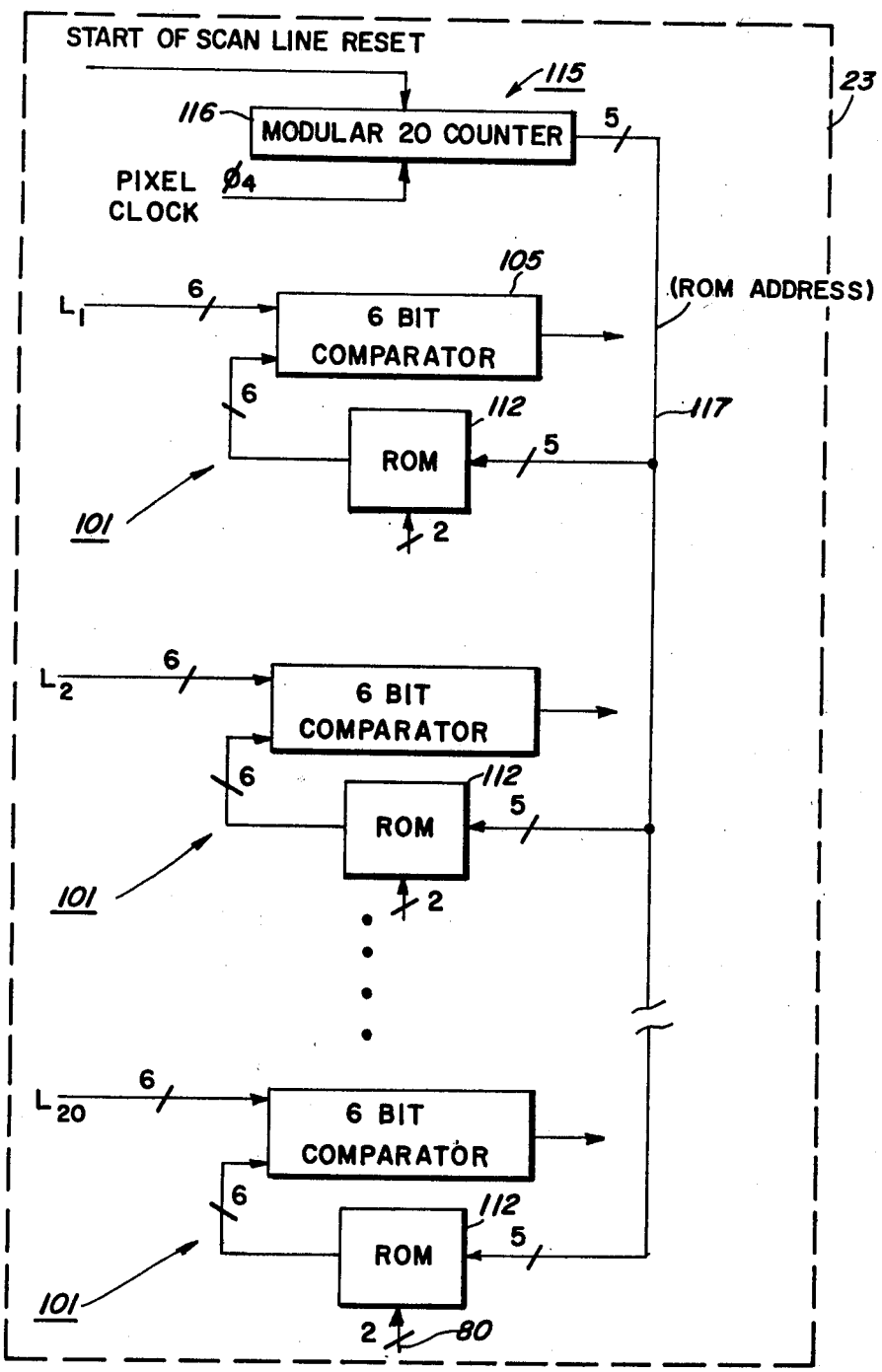
FIG. 10 is a schematic view of the screening circuit of the present invention.

Referring to FIG. 10, Screen Section 23 is comprised of a series of screening circuits 101, there being one screening circuit 101 for each line of image data (i.e. lines $L_1$, $L_2$, $L_3$ ... $L_{20}$). Each screening circuit 101 has a 6 bit comparator 105 for comparing the voltage levels of the image pixels with the appropriate threshold voltage of the screen in use. Comparators 105 may be built by the concatenation of Texas Instruments Chips No. SER. NO. 7485.

A ROM memory 112 stores the various predetermined threshold voltages that make up the several screens which may be used, for example, the threshold voltages for screens 100, 102. ROM memory 112 is addressed by the screen selection circuit 54 to provide the appropriate screen. The threshold voltages of the screen selected are in turn addressed by ROM address circuit 115. The process is repeated for the next block of twenty pixels, and so forth and so on until all of the pixels that comprise the group of lines being processed (i.e. lines $L_1$, $L_2$, $L_3$ ... $L_{20}$) have been processed. Thereafter, the process is repeated for the next group of image scan lines (i.e. lines $L_{21}$, $L_{22}$ ... $L_{40}$).

In the example given herein, ROM memories 112 each hold the discrete threshold values for screens 100, 102. While the threshold values of each screen are repetitive, as in the case of the 4×4 pixel matrix of screen 100 and the 5 ×5 pixel matrix of screen 102, threshold voltages for the entire 20×20 block 45 may nevertheless, be stored in memory 112 to simplify address circuit 115.

Address circuit 115 comprises a suitable counter 116 driven by clock pulses $\phi_4$ from pixel clock 55. Counter 116 is set to count to twenty and the reset to zero pending receipt of the next block of clock pulses $\phi_4$. Counter 116 generates at each count a 5 bit address in line 117 to ROM memories 112 to provide the individual screen thresholds.

Figure 12:
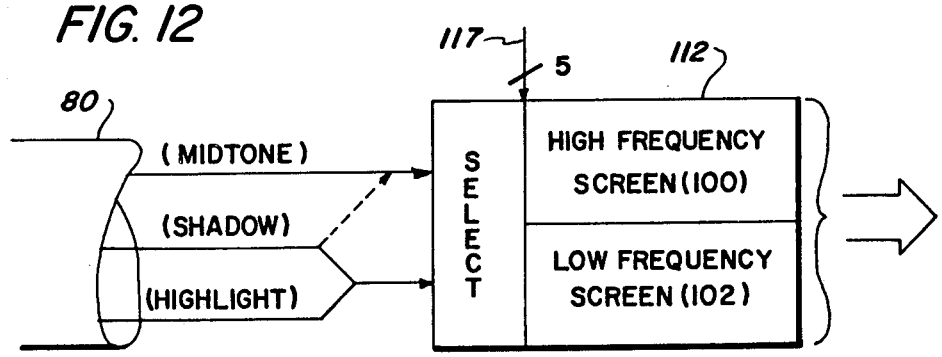
FIG. 12 is an enlarged view showing details of the screen selection memory.

Referring to FIG. 12, in a first embodiment of the invention, ROM memories 112 are programmed to select high frequency screen 100 in response to a midtone address signal in line 80 of screen selection circuit 54 and to select low frequency screen 102 in response to either a highlight or shadow address signal in line 80 of screen selection circuit.

In a second embodiment, shown by dotted lines in FIG. 12, ROM memories 112 are programmed to select high frequency screen 100 in response to either a midtone or shadow address signal in line 80 and to select low frequency screen 102 in response to a highlight address signal in line 80.

It may also be understood that instead of high and low frequency screens 100, 102 alone, an individual screen may be provided for use in processing each of highlight, midtone, and shadow image areas. In that circumstance high, medium, and low frequency screens would be stored in ROM memories 112 of screening section 23, each screen being selectable in response to midtone, shadow and highlight address signals. Exemplary screening frequencies for high, medium and low frequency screens are 125 dots/inch (i.e. screen 100), 100 dots/inch (i.e. screen 102), and 50 dots/inch respectively.

While the invention has been described with reference to the structure disclosed, it is not confined to the details set forth, but is intended to cover such modifications or changes as may come within the scope of the following claims:

What is claimed is:

1. The method of processing an original which may be comprised of shadow, midtone or highlight image areas, or some combination thereof, to enhance printing of copies of said original by a copier while offsetting any limitations of said copier to print relatively small and relatively large dots, the steps which comprise:
   (a) obtaining the average gray level of a preset area of said original;
   (b) comparing the said average gray value with predetermined first and second threshold values;
   (c) where said average gray level is equal to or below said first threshold value, screening said preset image area with a low frequency screen;
   (d) where said average gray level is equal to or above said second threshold value, screening said preset image area with said low frequency screen;
   (e) where said average gray level is between said first and second threshold values screening said preset image area with a high frequency screen; and
   (f) repeating steps a-d until processing of said original is completed.

2. An image screening process, the steps of:
   (a) obtaining the average gray level for a preset area of an original image;
   (b) comparing said gray level with a preset gray level threshold;
   (c) where said gray level is equal to or less than said threshold, screening said preset image area with a low frequency screen;
   (d) where said gray level is greater than said threshold, screening said preset image area with a high frequency screen; and
   (e) repeating steps a-d until all areas of said original have been screened.

3. In the method of screening pixel image data of unknown image content, the steps of:
   (a) subdividing said pixel image data into a succession of relatively small blocks for processing purposes;
   (b) analyzing each of said image data blocks for purposes of classifying said image data blocks as highlight, midtone, or shadow image areas; and
   (c) screening each of said image data blocks with one of a plurality of different frequency screens in accordance with the classification of the image area comprising said image data block.

4. The method according to claim 3 including the step of subdividing said image data into blocks of a size compatible with all of said different frequency screens.

5. The method according to claims 3 or 4 including the steps of:
   (a) storing said different frequency screens in memory;
   (b) providing a screen address in association with each of said image area classifications; and
   (c) addressing said memory with said screen addresses to provide a screen of predetermined frequency with each of said image data blocks.

6. Apparatus for processing image data in digital form to provide a binary output, the combination comprising:
   (a) means for subdividing said image data into a succession of discrete areas of predetermined size;
   (b) means for electronically screening said image data, said screening means including addressable memory means storing a plurality of different frequency electronic screens for use in screening said image data;
   (c) means for analyzing said discrete image areas to identify the image therein as a highlight, midtone, or shadow image,
   said analyzing means including means for generating a screen selecting address according to the type of image identified; and
   (d) means for addressing said memory means with said address whereby to screen each of said discrete image areas with the frequency screen associated with the image therein.

7. Apparatus according to claim 6 in which said memory means stores at least two screens, one of said screens having a screening frequency greater than the screening frequency of said other screen;
   said addressing means addressing said one screen in response to a midtone image and said other screen in response to either a highlight or shadow image.

8. Apparatus according to claim 6 in which said memory means stores at least two screens, a first of said screens being a high frequency screen, a second of said screens being a low frequency screen;
   said addressing means addressing said first screen in response to either a midtone or shadow image, and said second screen in response to a highlight image.

9. Apparatus according to claim 6 in which the screening frequency of said screens is such that the screen matrices formed by each of said screens is evenly divisible into said discrete areas.

10. Apparatus according to claim 6 in which said memory holds at least three screens, a first of said screens having a relatively high screening frequency, a second of said screens having an intermediate screening frequency lower than the screening frequency of said first screen, and a third of said screens having a relatively low screening frequency lower than the screening frequency of said second screen,
    said addressing means addressing said first screen in response to a midtone image, said second screen in response to a shadow image, and said third screen in response to a highlight image.

11. Apparatus according to claim 6 in which said memory holds at least three screens, a first of said screens having a relatively high screening frequency, a second of said screens having an intermediate screening frequency lower than the screening frequency of said first screen, and a third of said screens having a relatively low screening frequency lower than the screening frequency of said second screen,
    said addressing means addressing said first screen in response to a midtone image, said second screen in response to a highlight image, and said third screen in response to a shadow image.

* * * * *